United States Patent
Van Der Linden

(10) Patent No.: US 8,371,281 B2
(45) Date of Patent: Feb. 12, 2013

(54) SCENT SHOOTER

(76) Inventor: Jay Edward Van Der Linden, Forest Park, GA (US)

( * ) Notice: Subject to any disclaimer, the term of this patent is extended or adjusted under 35 U.S.C. 154(b) by 0 days.

(21) Appl. No.: 13/100,853

(22) Filed: May 4, 2011

(65) Prior Publication Data

US 2011/0277735 A1    Nov. 17, 2011

Related U.S. Application Data

(60) Provisional application No. 61/334,870, filed on May 14, 2010.

(51) Int. Cl.
*F41B 3/02*    (2006.01)

(52) U.S. Cl. ........................................ 124/20.2

(58) Field of Classification Search ........ 124/20.1–20.3, 124/1; 239/152
See application file for complete search history.

(56) References Cited

U.S. PATENT DOCUMENTS

| | | | | |
|---|---|---|---|---|
| 239,865 A * | 4/1881 | Smith | ........................... | 124/20.1 |
| 2,324,201 A * | 7/1943 | Donaldson | ................... | 124/20.1 |
| 2,823,483 A * | 2/1958 | Malott | .............................. | 43/19 |
| 3,270,734 A * | 9/1966 | Clements | ..................... | 124/20.2 |
| 3,407,798 A * | 10/1968 | Rock | ............................. | 124/20.2 |
| 3,572,311 A * | 3/1971 | Baer | ............................. | 124/20.1 |
| 4,274,387 A * | 6/1981 | McBride | ...................... | 124/20.2 |
| 4,726,584 A | 2/1988 | Bishop | | |
| 4,881,743 A | 11/1989 | Fiorenzo | | |
| 5,033,446 A | 7/1991 | Bradt | | |
| 5,035,183 A | 7/1991 | Luxton | | |
| 5,123,657 A | 6/1992 | Colt et al. | | |
| 5,303,496 A | 4/1994 | Kowalkowski | | |
| 5,456,036 A | 10/1995 | Butz | | |
| 6,800,252 B1 | 10/2004 | Jedzinski | | |
| 6,810,614 B2 | 11/2004 | Phillips | | |
| 6,857,579 B2 | 2/2005 | Harris | | |
| 6,880,765 B2 | 4/2005 | Tuomikoski et al. | | |
| 7,073,732 B2 | 7/2006 | Abbas et al. | | |
| 7,451,679 B2 * | 11/2008 | Stevenson et al. | ............. | 89/1.51 |
| 7,533,832 B2 | 5/2009 | Price et al. | | |
| 7,604,556 B2 | 10/2009 | Witzigreuter | | |
| 2008/0313947 A1 | 12/2008 | Fachner | | |

* cited by examiner

*Primary Examiner* — Michael Carone
*Assistant Examiner* — Reginald Tillman, Jr.

(57) ABSTRACT

A scent shooter apparatus is disclosed. The scent shooter may include a projectile launcher. A vessel may be coupled to the projectile launcher and configured to hold a pellet and release the pellet during operation of the apparatus. The apparatus may include a piercer mounted on the vessel. The piercer may be disposed to pierce the pellet during operation of the apparatus.

8 Claims, 4 Drawing Sheets

SCENT SHOOTER

CROSS-REFERENCE TO RELATED APPLICATIONS

This application claims the benefit of priority of U.S. Provisional patent application No. 61/334,879, filed May 14, 2010, which is herein incorporated by reference.

BACKGROUND OF THE INVENTION

The present invention generally relates to hunting equipment, and more particularly, to a scent shooter.

One technique employed by hunters is to draw game out by dousing an area with chemicals that attract wildlife. For example, game can be lured into a particular area by using pheromones or other natural scents such as animal urine that the game can detect.

Some current methods of covering an area with these chemicals include manually pouring or spraying, however, these techniques can mean that a hunter physically traverses the same area so that the hunter's motion scares potential game away or may leave behind his own scent that the game can detect. Some other techniques include using breakable pellets that contain attractive scent as a lure. The pellets can be shot or launched toward an area so that the hunter may be an undetectable distance away, for example, approximately 240 ft. However, some pellets do not break on impact and are wasted, lost in the brush.

As can be seen, there is a need for an apparatus that improves the release of scent from a pellet that can be discharged from a distance.

SUMMARY OF THE INVENTION

In one aspect of the present invention, a scent discharging apparatus, comprises a handle; a projectile launcher coupled to the handle; a vessel coupled to the projectile launcher, the vessel configured to hold a pellet and release the pellet during operation of the apparatus; and a piercer mounted on the vessel, the piercer disposed to pierce the pellet during operation of the apparatus In another aspect of the present invention, a scent shooter apparatus, comprises a slingshot including a pair of slings attached to a fork and a handle; a partially enclosed shell coupled to the pair of slings; an internal compartment slidably disposed within the shell, the internal compartment configured to carry a pellet; and a piercer coupled through the outer shell and internal compartment, the piercer disposed to pierce the pellet as the internal compartment is slid within the outer shell.

In another aspect of the present invention, a scent shooter apparatus, comprises a handle; a pair of forks coupled to the handle; a pair of elastic slings coupled to the pair of forks; a rigid vessel coupled between the pair of elastic slings, the vessel configured to hold a pellet; and a spring-loaded piercer coupled to the vessel, wherein the piercer is disposed to pierce the pellet as the vessel is drawn toward a user extending the slings.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a scent shooter that can launch a projectile, for example, a pierced scent filled pellet, into an area distant from a user providing improved chances of a distant area being doused with an attractant for game. Additionally, exemplary embodiments of the present invention, control the timing of the piercing so as to control and mitigate spillage of the scent near the hunter.

Figure 1:
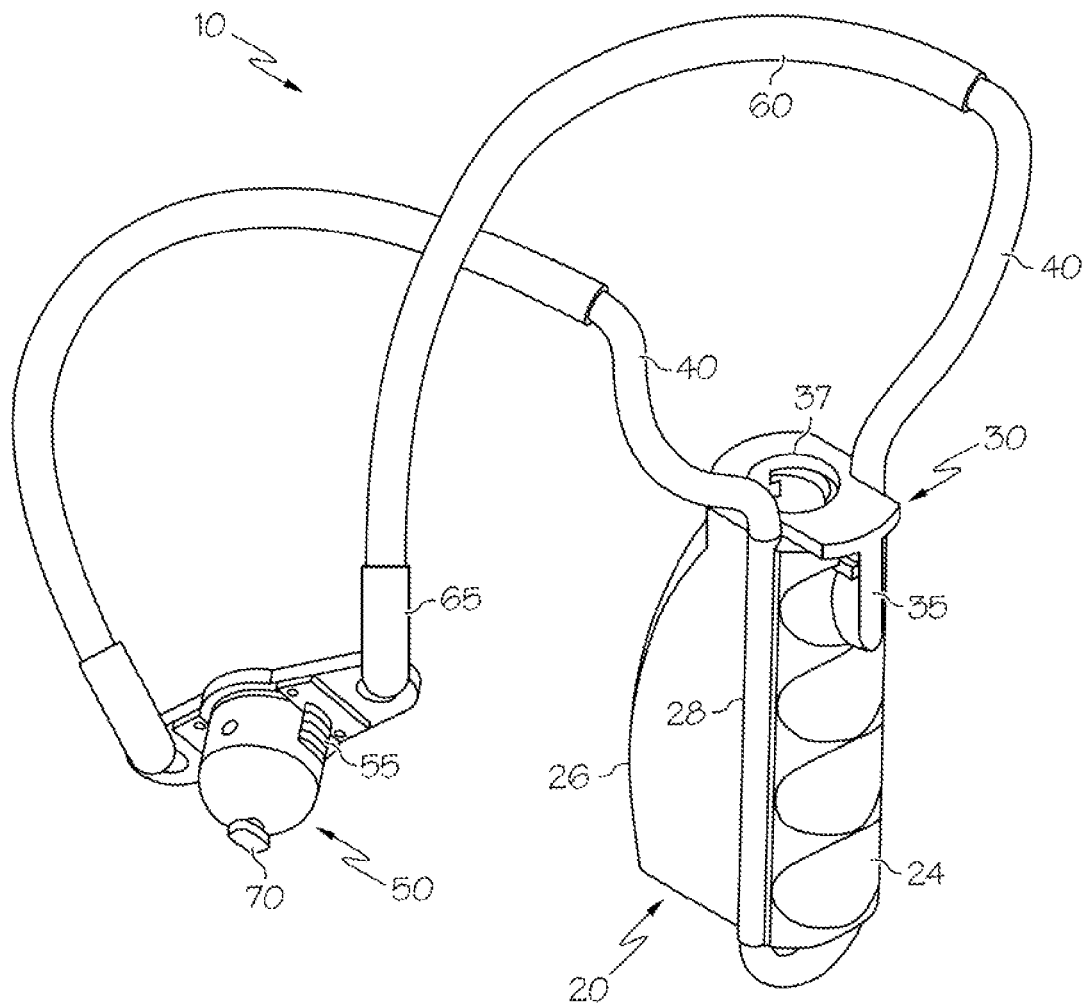
FIG. 1 is a front perspective view of a scent shooter according to an exemplary embodiment of the present invention.
Figure 2:
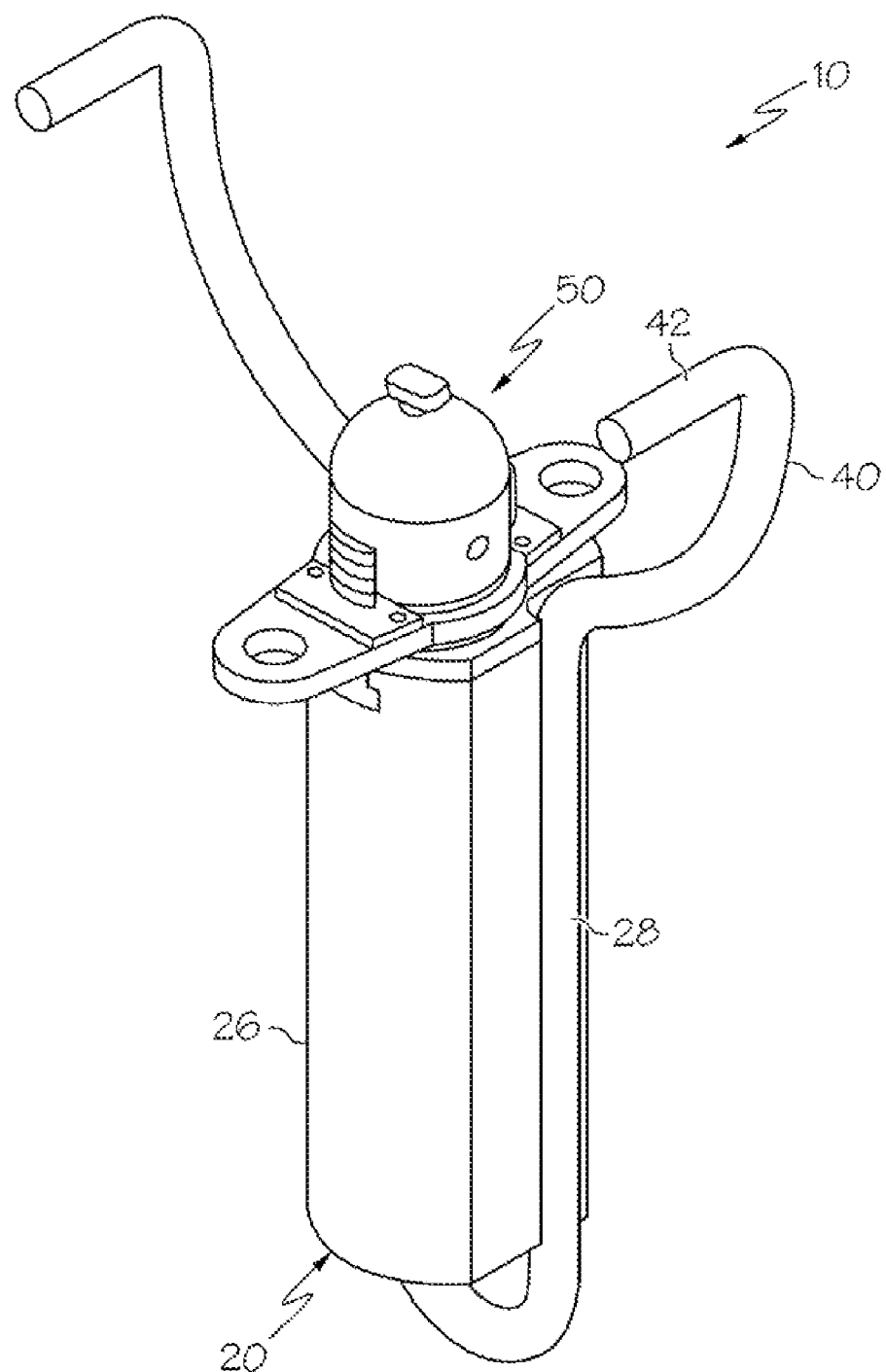
FIG. 2 is a perspective side view of the scent shooter of FIG. 1 with an exemplary embodiment of a vessel disposed over a handle chamber.
Figure 3:
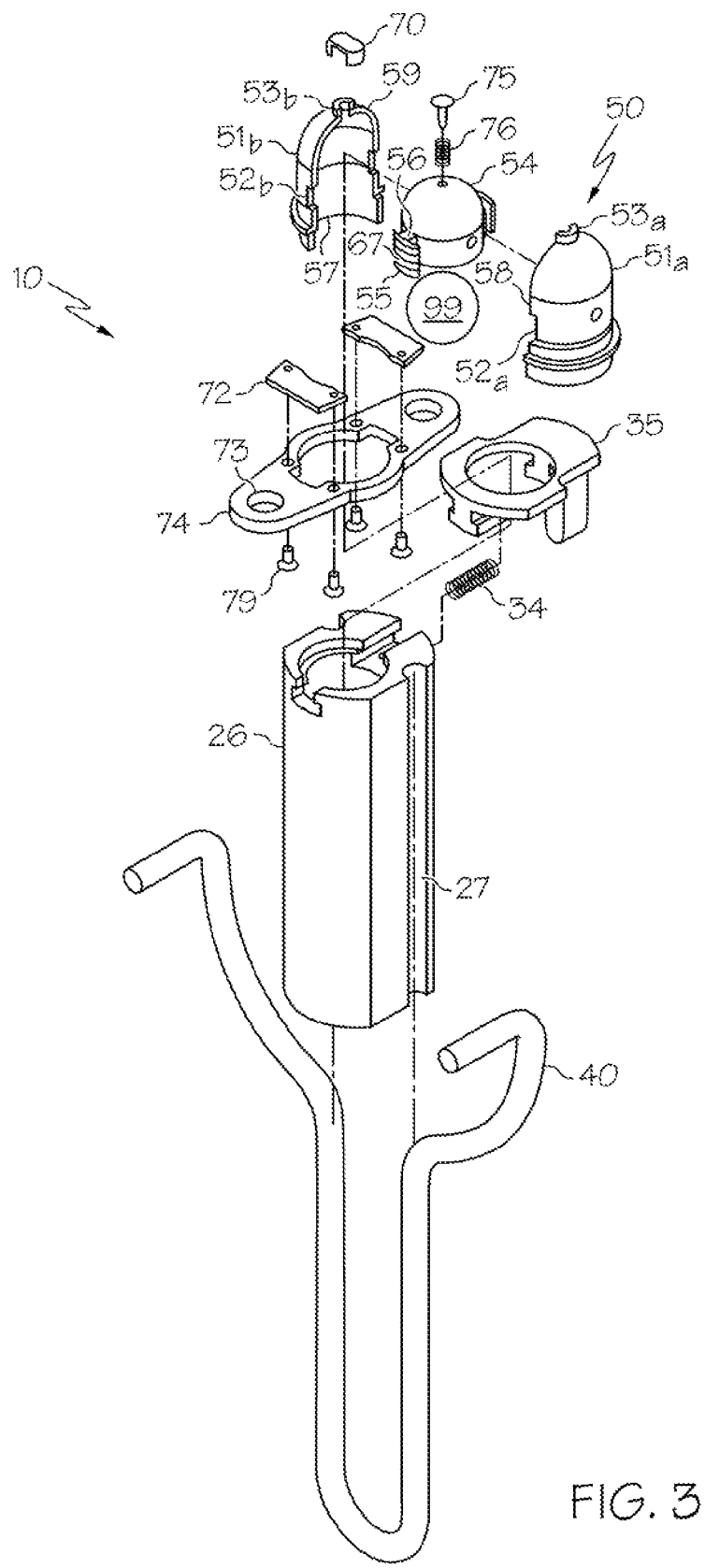
FIG. 3 is an exploded perspective view of the scent shooter of FIG. 1.
Figures 4, 5:
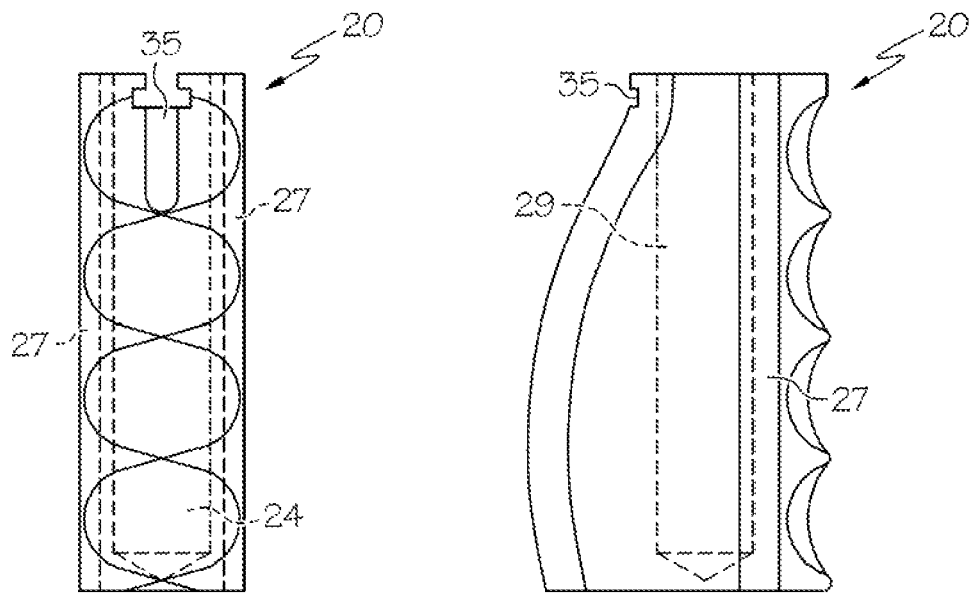
FIG. 4 is an isolated front view of the handle of FIG. 1.
FIG. 5 is a side view of the handle of FIG. 4.

Referring now to the Figures, an apparatus is shown that can pierce a scent filled pellet just prior to launch. FIGS. 1-3 show a scent shooter 10 that includes a handle 20 and a vessel 50. The scent shooter 10, in some exemplary embodiments, may be a slingshot including the handle 20, a pair of forks 40 coupled to the handle 20, and a pair of elastic slings 60 attached to the forks 40. The vessel 50 may be rigid and coupled to and between proximal ends 65 of the slings 60.

Figures 6, 7:
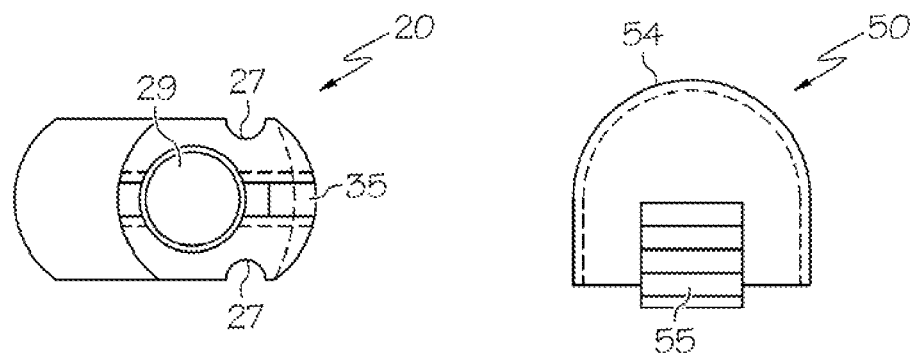
FIG. 6 is a top view of the handle of FIG. 4.
FIG. 7 is a side view of another exemplary embodiment of a vessel.
Figure 8:
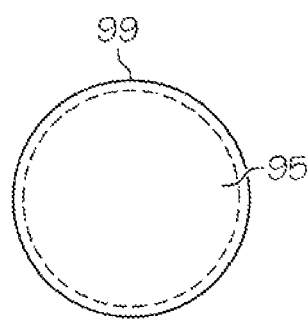
FIG. 8 is a front view of an exemplary scent pellet according to exemplary embodiments of the present invention.

Referring to FIGS. 3, 7, and 8, an exploded view of the scent shooter 10 is shown and in particular, the vessel 50 according to an exemplary embodiment of the present invention carrying a scent filled pellet 99. The vessel 50 may include an outer shell 51 and an internal compartment 54.

The outer shell 51 may be a unitary rigid piece or may be two separate halves 51a; 51b forming an elongated cup shape with an open front end 57 and a substantially enclosed back end 59. The outer shell 51 may include indents or slots 52 (shown as respective indent halves 52a and 52b) along side walls 58. A projection 53 (formed by interlocking elements 53a and 53b) may be disposed on the back enclosed end 59.

The internal compartment 54 may be substantially semi-spherical and sized to carry the pellet 99 within its interior. An exterior surface of the internal compartment 54 may include a pair of rails 56 disposed on opposite sides of the internal compartment 54 exterior. The rails 56 may each support a depressible tab 55. The tabs 55 may include a grip surface 67 that may include, for example, ridges.

A piercer 75, for example, a tack, a pin, or a blade, may be mounted on the vessel 50. The piercer 75 may be disposed to pierce the pellet 99 inside the internal compartment 54. In one exemplary embodiment, the piercer 75 may be coupled through the outer shell 51 and through the internal compartment 54. The piercer 75 may be spring loaded onto the vessel 50. In one exemplary embodiment, a coiled spring 76 may be mounted onto the piercer 75 between an interior of the outer shell 51 and the exterior of the internal compartment 54.

The scent filled pellet 99 may be spherical and substantially hollow except that it may be filled with a fluid 95. The scent filled pellet 99 may be a thin-skinned capsule made from, for example, a gelatin. The fluid 95 may be, for example, animal urine or other animal lure scents or masks.

In operation, a user may insert the pellet 99 into the internal compartment 54. The user may apply finger pressure to the tabs 55 when drawing the elastic slings 60 and vessel 50 back prior to launching the pellet 99. One may appreciate that the tabs 55 mounted on the rails 56 may slide along the indents 52 of the outer shell 51. The ridges on the grip surface 67 may aid the fingers of the user providing control during the draw and preventing slippage. As a user slides the tabs 55 rearward, the finger pressure applied to the pellet 99 simultaneously draws the internal compartment 54 and pellet 99 rearward within the outer shell 51. Thus, in one exemplary use, as the user begins to encounter resistance from the slings 60, the pellet 99 may be drawn rearward toward the piercer 75 and pierced just prior to launching. Once the pellet 99 is released, the coiled spring 76 may push the internal compartment 54 back into a default position within the outer shell 51.

Referring back to FIGS. 1-6, the handle 20 may include features to provide ease of handling and ease of dispensing the scented pellets 99. The handle 20 may include a curved rear surface 26 and a plurality of finger grips 24 on a front surface. The handle 20 may include an internal wall 29 defining a hollow chamber. The internal wall 29 may be large enough to fit scented pellets 99 so that the pellets 99 may move freely when stacked inside the handle 20. A valve 30 assembly may be disposed at the top of the handle 20 over the internal wall 29. The valve assembly 30 may include a spring loaded trigger 35. The trigger 35 may be depressed to reveal and release the contents of the internal wall 29. The handle 20 may also include a pair of lengthwise grooves 27 that may run from the top of the handle 20 down to the bottom and may accommodate fitted coupling of fork legs 28 to the handle 20.

The scent shooter 10 may include a yoke 74 coupling the vessel 50 to the handle 20 by way of fasteners 79. A pair of yoke locks 72 may be disposed between the yoke 74 and the vessel 50. The pair of yoke locks 72 may be positioned between the tabs 55 and the underlying yoke 74 surface. The yoke locks 72 may be configured to surround the front end 57 of the outer shell 51 and lock the outer shell 51 onto the yoke 74. It may also be appreciated that the yoke locks 72 may be configured to provide a stop for the tabs 55 as the internal compartment may reset to its default position after a launch. The yoke 74 may also include a pair of loops 73 on distal ends of the yoke 74. The elastic slings 60 may each be fastened to respective loops 73.

While the foregoing was described within the context of employing a slingshot, it will be understood that features and elements of the foregoing disclosure may describe other projectile launchers. Additionally, while other projectile launchers may not have been illustrated, those skilled in the art may appreciate that some of the foregoing features may be employed alone within other projectile launcher types. For example, the vessels described may be employed on a crossbow type launcher or a pneumatic gun.

It should be understood, of course, that the foregoing relates to exemplary embodiments of the invention and that modifications may be made without departing from the spirit and scope of the invention as set forth in the following claims.

What is claimed is:

1. A scent shooter apparatus, comprising:
  a slingshot including a pair of slings attached to a fork and a handle;
  a partially enclosed outer shell coupled to the pair of slings;
  an internal compartment slidably disposed within the shell, the internal compartment configured to carry a pellet; and
  a piercer coupled through the outer shell and internal compartment, the piercer disposed to pierce the pellet as the internal compartment is slid within the outer shell.

2. The scent shooter apparatus of claim 1, further comprising:
  a rail coupled to the internal compartment and projecting exteriorly of the outer shell; and
  a tab coupled to the rail and configured to slide the internal compartment within the outer shell.

3. A scent shooter apparatus, comprising:
  a handle;
  a pair of forks coupled to the handle;
  a pair of elastic slings coupled to the pair of forks;
  a rigid vessel coupled between the pair of elastic slings, the vessel configured to hold a pellet; and
  a spring-loaded piercer coupled to the vessel, wherein the piercer is disposed to pierce the pellet as the vessel is drawn toward a user extending the slings.

4. The scent shooter apparatus of claim 3, further comprising a pair of depressible tabs coupled to the vessel configured to engage the pellet onto the piercer.

5. The scent shooter apparatus of claim 4, further comprising ridges formed on the depressible tabs.

6. The scent shooter apparatus of claim 3, further comprising an internal wall within the handle, the internal wall forming a hollow chamber.

7. The scent shooter apparatus of claim 6, further comprising a trigger valve disposed on an end of the handle, the trigger valve configured to reveal and release contents within the hollow chamber.

8. The scent shooter apparatus of claim 7, wherein the trigger valve is spring loaded.

\* \* \* \* \*